March 10, 1964 G. V. ZITO 3,124,744
COLD CATHODE IONIZATION GAUGE ALTIMETER
WITH EQUILIBRIUM RESTORING MEANS
Filed Oct. 30, 1957 2 Sheets-Sheet 1
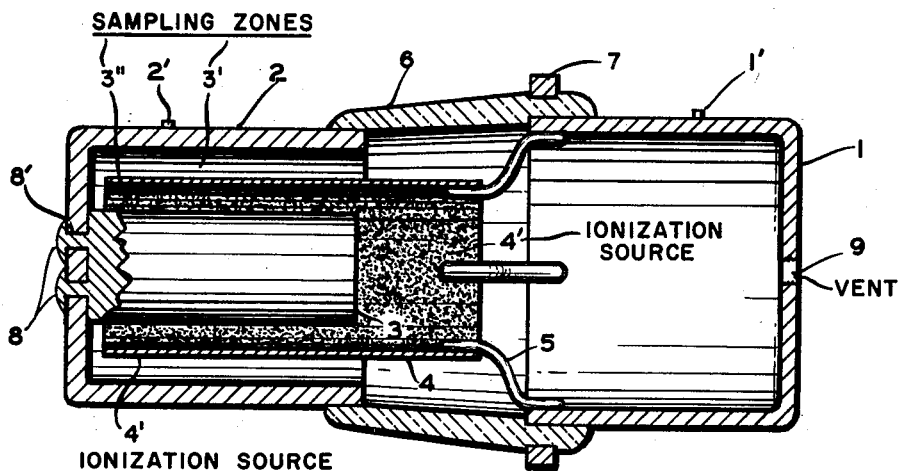
FIG. 1
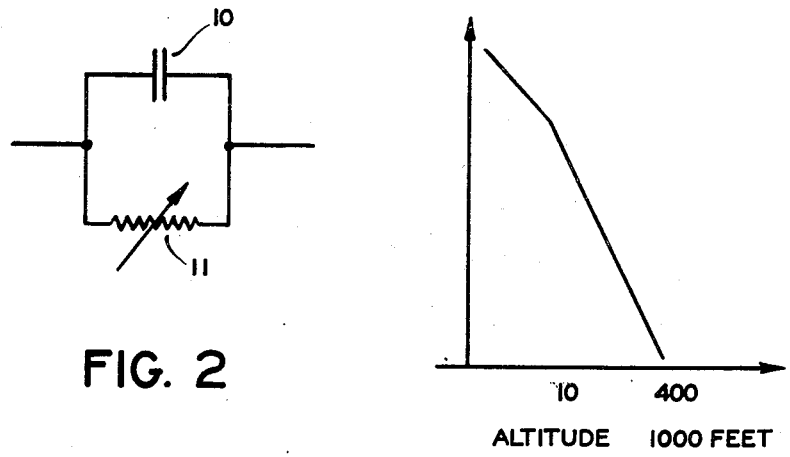
FIG. 2
FIG. 3
INVENTOR.
GEORGE V. ZITO

INVENTOR.
GEORGE V. ZITO
BY

ATTORNEY

United States Patent Office 3,124,744
Patented Mar. 10, 1964

3,124,744
COLD CATHODE IONIZATION GAUGE ALTIMETER WITH EQUILIBRIUM RESTORING MEANS
George V. Zito, Northvale, N.J., assignor to The Bendix Corporation, a corporation of Delaware
Filed Oct. 30, 1957, Ser. No. 693,323
10 Claims. (Cl. 324—33)

The invention relates to cold cathode ionization gauges and, more particularly, to their use for indicating altitude or air density.

Cold cathode ionization gauges, as used heretofore, employ an alpha particle source of relatively small area for ionizing the atmosphere within the gauge. This results in relatively small variations in current flow through the gauge with changes in air density because of the inefficient ionization collection on the electrodes caused by non-uniform ionization of the sampled atmosphere between the electrodes and the small area of the electrodes. The gauges require relatively large potentials for their operation, causing external surface leakage currents which render the gauges inaccurate.

One object of the present invention is to provide an altimeter having a cold cathode ionization gauge in which the variations in current flow with changes in density of the sampled atmosphere between the electrodes are relatively high, even when operated at low potentials, so that the external surface leakage current is negligible.

Another object of the invention is to provide an altimeter having a cold cathode ionization gauge in which the entire sampled atmosphere between the electrodes is substantially uniformly ionized and in which the electrodes have a relatively large area for efficient ion collection.

Another object is to provide an altimeter using an ionization gauge having an ionizing source of relatively large area closely associated with and uniformly distributed about the surfaces of the electrodes.

Another object is to provide an altimeter having an ionization gauge in which relatively few ions recombine.

Another object is to provide an altimeter having an ionization gauge of uniform geometry which is easily manufactured and which is reliable and suitable for mobile use.

Another object is to provide an altimeter using a cold cathode ionization gauge and which is highly accurate over a wide range and at altitudes exceeding 400,000 feet.

Another object of the invention is to provide an altimeter having an ionization gauge which may be operated from either an alternating or direct current source.

The foregoing and other objects and advantages of the invention will appear more fully from a consideration of the detailed description which follows, in conjunction with the accompanying drawings, wherein several embodiments of the invention are illustrated. It is to be expressly understood, however, that the drawings are for the purposes of illustration and description, and are not to be construed as defining the limits of the invention.

In the drawings:

FIG. 1 is a cross-sectional view of an ionization gauge for use in an altimeter constructed according to the invention;

FIG. 2 is a schematic diagram showing the equivalent electrical circuit of the gauge of FIG. 1;

FIG. 3 is a graph showing the current output of the gauge as a function of altitude;

Figure 4:
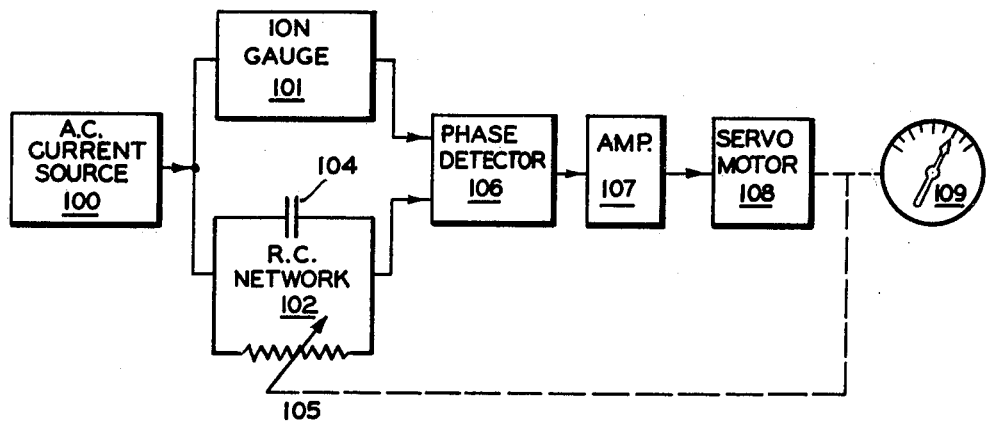
FIG. 4 is a block diagram of one form of novel altimeter energized by an alternating current source and using the gauge of FIG. 1.

A novel ionization gauge for use in an altimeter constructed according to the invention is shown in FIG. 1 as comprising an anode cup 1 and a cathode cup 2 insulated from one another by a cylindrical glass portion 6. The glass portion 6 may be secured to anode cup 1 and cathode cup 2 by any suitable means, such as by Kovar glass-to-metal seals. A cylindrical cathode stud 3 extends inwardly of cup 2 coaxially therewith and is secured to the closed end of cathode cup 2 by any suitable means. In the embodiment shown, projections 8 on the stud extend through apertures 8' in the cathode cup and are peened over on the outer surface of the cup. In some instances, it may be desirable to braze the stud 3 to cathode cup 2.

A cylinder 4, preferably of metallic foil, has its outer surface and, in some instances, its inner surface coated with a source 4' of ionization which preferably provides alpha particles, such as a radium salt, and is supported from anode 1 by brackets 5 of conducting material. The cylinder 4 is coaxial with cathode cup 2 and is equi-distant from cathode cup 2 and stud 3. Cylinder 4 is closely associated with cathode cup 2 and stud 3 so that the space between cylinder 4 and cathode cup 2 and the space between the cylinder and stud 3 are relatively small and provide sampling zones 3' and 3" respectively. This structure also provides a capacitor with electrodes of large area and of substantially constant capacitance.

A guard ring 7 surrounds the glass portion 6 to shunt external leakage currents to ground. The guard ring may comprise a layer of metal plated on the glass. An opening or vent 9 is provided in anode cup 1 for communication with the atmosphere so that the interior of the ionization gauge including the sampling zones between the electrodes is at static atmospheric pressure. Suitable electrical connections 1' and 2' may be made to the exterior surface of anode cup 1 and cathode cup 2.

With the ionization material distributed parallel to the electrodes 2, 3 and 4, as described, the sampled atmosphere in the zones between the electrodes 2 and 4 and 3 and 4 is ionized by ionization source 4' substantially uniformly and the electrodes are close together and of relatively large area to provide for efficient ion collection. As a result, relatively large variations in current flow occur through the gauge with small changes in density of the atmosphere and the gauge operates at low potentials across the anode and cathode so that external surface leakage current is negligible. Furthermore, the gauge has a relatively large capacity but a short time constant.

The equivalent electrical circuit of the gauge of FIG. 1 is shown in FIG. 2 as comprising variable resistor 11 in parallel with a fixed capacitor 10. As the density of the sampled air changes, the capacity of capacitor 10 remains the same. However, as the air density increases, the resistance of resistor 11 to current flow decreases because the number of ions produced in the sampled atmosphere between the electrodes increases and, as the air density decreases, the resistance to current flow increases because the number of ions in the sampled atmosphere decreases. This is readily apparent from the curve shown in FIG. 3 in which current I is plotted as the ordinate and pressure is plotted as the abscissa. It will be observed that the variation of current to pressure is substantially linear and that the slope of the curve is relatively steep so that large variations in current flow occur in the gauge with small changes in pressure. The gauge may thus be considered as a fixed capacitance having a variable dissipation factor wherein leakage current within the gauge is proportional to altitude.

When the gauge is energized by alternating current at frequencies of 400 cycles per second, the phase shift across the gauge varies over measurable limits and it is this feature of the present invention which enables the gauge to be operated from an alternating current source, as shown in FIG. 4 and described more fully below. This feature provides distinct advantages for instrumentation and control.

The altimeter shown in FIG. 4 includes an ionization gauge 101 energized by an alternating current source 100 which may be a 400 cycle source normally available in aircraft. The ionization gauge is connected in parallel with a network 102 and to source 100. Network 102 comprises a capacitor 104 and a variable resistor 105 connected in parallel with one another. A phase detector 106 is connected to the ionization gauge 101 and network 102 for detecting the relative phases of the voltages therefrom. The output of phase detector 106 is applied to an amplifier 107 which operates a servo motor 108 mechanically connected to an indicator 109 and to variable resistor 105 of network 102.

As the air density in ionization gauge 101 changes with changes in altitude, the current through gauge 101 shifts phase relative to the current through network 102 and this phase shift is detected by phase detector 106. This variation in phase controls servomotor 108 which adjusts resistor 105 until its resistance is varied sufficiently so that the current through network 102 is in phase with the current through ionization gauge 101. Indicator 109 may be calibrated so that altitude may be read directly on the indicator. The device registers either an increase or decrease in altitude since detector 106 distinguishes leading or lagging phase differentials and operates the servomotor in one direction for leading phase currents of ionization gauge 101 relative to network 102 and in the opposite direction for lagging phase relationships.

Figure 5:
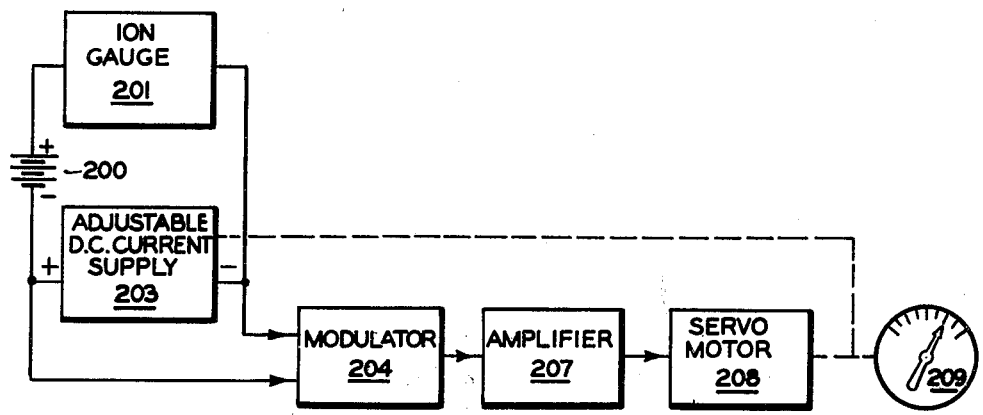
FIG. 5 is a block diagram of another form of novel altimeter energized by a direct current source and using the gauge of FIG. 1.

FIG. 5 shows an altimeter using an ionization gauge 201 energized from a direct current source 200. An adjustable direct current source 203 is connected in opposition across ionization gauge 201 and direct current source 200. A modulator 204 is connected to this parallel circuit arrangement and the output of modulator 204 is applied to amplifier 207 which controls operation of servomotor 208 drivably connected with an indicator 209 and with adjustable direct current source 203. When the air density in the ionization gauge changes with change in altitude, the voltage across direct current source 200 and ionization gauge 201 varies relative to the voltage across direct current supply 203 and the difference in voltages is applied to modulator 204.

The output of modulator 204 controls operation of servomotor 208 to adjust the voltage of direct current supply 203 to zero. The voltage across source 200 and ionization gauge 201 also is zero at this time. Indicator 209 may be calibrated to read altitude directly as described in connection with indicator 109. Modulator 204 is sensitive to the polarity of the voltage resulting from the unbalance of source 200 and ionization gauge 201 relative to direct current supply 203 and servomotor 208 operates in either direction to move direct current supply 203 to zero and moves indicator 209 in either direction corresponding to an increase or decrease in altitude.

The novel ionization gauge of the present invention is readily adaptable for use in altimeters which may be energized by either alternating or direct current sources and which are highly accurate over a wide range of altitudes and at altitudes exceeding 400,000 feet.

Although several embodiments of the invention have been described in detail, it is to be expressly understood that the invention is not limited thereto. Various changes can be made in the design and arrangement of the parts without departing from the spirit and scope of the invention, as the same will now be understood by those skilled in the art.

I claim:

1. A wide range altimeter including a cold cathode ionization gauge subject to changes in air density and comprising anode and cathode elements opposing one another and providing a sampling zone therebetween, and a source of ionizing material uniformly distributed on one of the elements to ionize the sampling zone substantially uniformly, a source of potential for energizing said gauge, and circuit means connected to said ionization gauge and cooperating with the gauge to provide an output when the air density changes, and means responsive to the output and cooperating with said circuit means for restoring equilibrium between said circuit means and said ionization gauge to null the output.

2. A wide range altimeter including a cold cathode ionization gauge subject to change in air density and comprising a cylindrical member with a cylindrical stud coaxial therewith and forming one electrode, a second electrode cylindrical in shape and positioned between the member and stud and coaxial therewith and cooperating with the first electrode to form sampling zones therebetween, and a source of ionizing material distributed on one of the electrodes to ionize the sampling zones substantially uniformly, a source of potential for energizing said gauge, and circuit means connected to said gauge and cooperating with the gauge to provide an output when the air density changes, and means responsive to the output and cooperating with said circuit means for restoring equilibrium between the circuit means and the ionization gauge to null the output.

3. A wide range altimeter comprising circuit means including an adjustable impedance connected to an ionization gauge subject to changes in air density, said ionization gauge comprising closely spaced anode and cathode elements providing a sampling zone therebetween, and a source of ionizing material positioned in the sampling zone and arranged in the gauge to ionize the sampling zone substantially uniformly, a source of alternating current for energizing the circuit, means connected to said circuit for detecting relative phase shift between the alternating currents passing therethrough, means responsive to the phase detecting means for adjusting the impedance to null the output of said phase detecting means, and an altitude indicator operated by said responsive means.

4. A wide range altimeter comprising circuit means including an adjustable impedance connected to an ionization gauge subject to changes in air density, said ionization gauge comprising closely spaced opposing anode and cathode elements providing a sampling zone therebetween, and a source of ionizing material uniformly distributed on one of the elements to ionize the sampling zone substantially uniformly, a source of alternating current for energizing the circuit, means connected to said circuit for detecting relative phase shift between the alternating currents passing therethrough, means responsive to the phase detecting means for adjusting the impedance to null the output of said phase detecting means, and an altitude indicator operated by said responsive means.

5. A wide range altimeter comprising circuit means including an adjustable impedance connected to an ionization gauge subject to changes in air density, said ionization gauge comprising a cylindrical member with a cylindrical stud coaxial therewith and forming one electrode, a second electrode cylindrical in shape and positioned between the member and stud and coaxial therewith and cooperating with the first electrode to form sampling zones therebetween, and a source of ionizing material uniformly distributed on one of the electrodes to ionize the sampling zones substantially uniformly, a source of alternating current for energizing the circuit, means connected to said circuit for detecting relative phase shift between the alternating currents passing therethrough, means responsive to the phase detecting means for adjusting the impedance to null the output of the phase detecting means, and an altitude indicator operated by said responsive means.

6. A wide range altimeter comprising a circuit having an adjustable direct current supply in one leg and a source of direct current operating potential and a cold cathode ionization gauge subject to changes in air density in another leg, said adjustable direct current having its potential arranged in opposition to the operating potential connected to the ionization gauge, said gauge comprising closely spaced anode and cathode elements providing a sampling zone therebetween, and a source of ionizing material positioned in the sampling zone and arranged in the gauge to ionize the sampling zone substantially uniformly, and means connected to said circuit and responsive to the voltage output of said circuit with changes in air density and cooperating with said adjustable source for restoring voltage equilibrium between the circuit legs to null the circuit output, and altitude indicating means operated by said responsive means.

7. A wide range altimeter comprising a circuit having an adjustable direct current supply in one leg and a source of direct current operating potential and a cold cathode ionization gauge subject to changes in air density in another leg, said adjustable direct current having its potential arranged in opposition to the operating potential connected to the ionization gauge, said gauge comprising closely spaced opposing anode and cathode elements providing a sampling zone therebetween and a source of ionizing material uniformly distributed on one of the elements to ionize the sampling zone substantially uniformly, and means connected to said circuit and responsive to the voltage output of said circuit with changes in air density and cooperating with said adjustable source for restoring voltage equilibrium between the circuit legs to null the circuit output, and altitude indicating means operated by said responsive means.

8. A wide range altimeter comprising a circuit having an adjustable direct current supply in one leg and a source of direct current operating potential and a cold cathode ionization gauge subject to changes in air density in another leg, said adjustable direct current having its potential arranged in opposition to the operating potential connected to the ionization gauge, said gauge comprising a cylindrical member with a cylindrical stud coaxial therewith and forming one electrode, a second electrode cylindrical in shape and positioned between the member and stud and coaxial therewith and cooperating with the first electrode to form sampling zones therebetween, and a source of ionizing material uniformly distributed on one of the electrodes to ionize the sampling zones substantially uniformly, and means connected to said circuit and responsive to the voltage output of said circuit with changes in air density and cooperating with said adjustable source for restoring the voltage equilibrium between the circuit legs to null the circuit output, and altitude indicating means operated by said responsive means.

9. A wide range altimeter comprising an ionization gauge subject to changes in air density, a source of alternating current of predetermined phase angle energizing the gauge, means connected to the ionization gauge for detecting a phase shift in the current through said gauge, means responsive to the output of the phase detecting means to restore the phase angle to the predetermined phase angle, and an indicator operated by said responsive means for indicating altitude.

10. A wide range altimeter comprising circuit means including an adjustable impedance connected to an ionization gauge subject to changes in air density, a source of alternating current for energizing the circuit, means connected to said circuit for detecting relative phase shift between the alternating currents passing therethrough, means responsive to the phase detecting means for adjusting the impedance to null the output of said phase detecting means, and an altitude indicator operated by said responsive means.

References Cited in the file of this patent

UNITED STATES PATENTS

| | | |
|---|---|---|
| 2,395,623 | Goldstein et al. | Feb. 26, 1946 |
| 2,497,213 | Downing | Feb. 14, 1950 |
| 2,627,543 | Obermaier | Feb. 3, 1953 |
| 2,629,837 | Benade et al. | Feb. 24, 1953 |
| 2,709,229 | Linder | May 24, 1955 |
| 2,750,560 | Miles | June 12, 1956 |
| 2,761,976 | Obermaier et al. | Sept. 4, 1956 |
| 2,795,716 | Roberts | June 11, 1957 |
| 2,797,385 | Miles | June 25, 1957 |
| 2,908,819 | Marx | Oct. 13, 1959 |

FOREIGN PATENTS

| | | |
|---|---|---|
| 398,722 | Great Britain | Sept. 21, 1933 |